US008744199B2

(12) United States Patent
Hiraga et al.

(10) Patent No.: US 8,744,199 B2
(45) Date of Patent: Jun. 3, 2014

(54) IMAGE PROCESSING DEVICE, IMAGE PROCESSING METHOD AND STORAGE MEDIUM

(75) Inventors: Masaki Hiraga, Tokyo (JP); Toshiki Shiino, Tokyo (JP); Akira Fujibayashi, Yokosuka (JP); Choong Seng Boon, Yokohama (JP)

(73) Assignee: Morpho, Inc., Tokyo (JP)

( * ) Notice: Subject to any disclaimer, the term of this patent is extended or adjusted under 35 U.S.C. 154(b) by 772 days.

(21) Appl. No.: 12/903,838

(22) Filed: Oct. 13, 2010

(65) Prior Publication Data

US 2011/0081085 A1 Apr. 7, 2011

(51) Int. Cl.
G06K 9/36 (2006.01)

(52) U.S. Cl.
USPC .......................... 382/232; 383/232; 383/276

(58) Field of Classification Search
USPC ................................................ 382/232, 276
See application file for complete search history.

(56) References Cited

U.S. PATENT DOCUMENTS

2009/0195697 A1* 8/2009 Kanumuri et al. ............ 348/607

FOREIGN PATENT DOCUMENTS

| CN | 1411665 A | 4/2003 |
| CN | 1969559 A | 5/2007 |
| JP | 06-343170 A | 12/1994 |
| JP | 07-023926 A | 1/1995 |
| JP | 2008-104059 A | 5/2008 |
| JP | 2008-283599 A | 11/2008 |
| WO | 2009/100032 A1 | 8/2009 |

OTHER PUBLICATIONS

Combined spatial—denoising, Balster et al., IEEE, 1051-8215, 2006, pp. 220-230.*
Bandoh, Yukihiro et al., "A study on H.264/AVC mode decision based on human visual system", IPSJ SIG Technical Reports, vol. 2006, No. 102, Information Processing Society of Japan, Sep. 29, 2006, p. 35-39.
Eric Balster et al., "Combined Spatial and Temporal Domain Wavelet Shrinkage Algorithm for Video Donoising", IEEE Transactions on Circuits and Systems for Video Technology, vol. 16, No. 2, Feb. 1, 2006, pp. 220-230.
Xi Zhang, et al., "Flicker Reduction for Motion JPEG2000 Using Wavelet Thresholding", 2010 17th IEEE International Conference on Image Processing, Sep. 26, 2010, pp. 2529-2532.

(Continued)

Primary Examiner — Jayesh A Patel
(74) Attorney, Agent, or Firm — Sughrue Mion, PLLC

(57) ABSTRACT

An image processing device includes: processing pixel group determination unit that determines a to-be-processed pixel group from a plurality of frame images of picture signals input based on a first predetermined rule and that determines a processed pixel group from the processed frame image stored based on a second predetermined rule; frequency component processing unit that extracts at least a temporal frequency component from the to-be-processed pixel group and the processed pixel group, that executes predetermined coefficient processing on a temporal high-frequency component of the temporal frequency component and that acquires the executed to-be-processed pixel group; processing completion frame generation unit that generates a processing completion frame image from the executed to-be-processed pixel group; and image output unit that outputs the processing completion frame image and that stores the processing completion frame image in the processed frame storage unit, in which the frequency component processing unit prevents the predetermined coefficient processing from being executed on a component having low sensitivity in visual characteristic included in the temporal high-frequency component.

11 Claims, 12 Drawing Sheets

(56) References Cited

OTHER PUBLICATIONS

Mukesh Motwani et al., "Survey of Image Denoising Techniques" Proceedings of the Global Signal Processing Expo and Conference, Sep. 27, 2004, pp. 1-8.

Tadashi Oyama et al., "New Edition Sensation/Perception Psychology Handbook," p. 583, Seishin Shobo, Feb. 1994.

Chinese Office Action dated Jan. 10, 2014 issued in counterpart application No. 201010511768.7.

* cited by examiner

*Fig.5*

| A |   | B |
|---|---|---|
|   |   |   |
| B |   | B |

Fig.6

| A |   | B |
|---|---|---|
|   |   | C |
| B | C | B |

Fig.7

| D | F |   | E |
|---|---|---|---|
| F | F |   |   |
|   |   |   |   |
| E |   |   | E |

Fig.8

| G | G |  |  |  |  | H | H |
|---|---|---|---|---|---|---|---|
| G | G |  |  |  |  | H | H |
|   |   |   |   |   |   |   |   |
|   |   |   |   |   |   |   |   |
|   |   |   |   |   |   |   |   |
|   |   |   |   |   |   |   |   |
| H | H |   |   |   |   | H | H |
| H | H |   |   |   |   | H | H |

IMAGE PROCESSING DEVICE, IMAGE PROCESSING METHOD AND STORAGE MEDIUM

BACKGROUND OF THE INVENTION

1. Field of the Invention

The present invention relates to an image processing device, an image processing method and a storage medium storing an image processing program which execute reduction processing on distortion such as flicker included in an image.

2. Related Background of the Invention

"Picture" is formed by continuously using "frame images", each of which is a single still image. Picture processing including the acquisition, transmission, compression (encoding and decoding), reduction and enlargement of picture generally causes various types of distortion. Therefore, it is a great challenge to reduce the distortion in the picture processing.

On the other hand, cameras have recently been incorporated in mobile terminals such as cell phones and, as the speed of mobile communication networks is increased, users increasingly watch downloaded picture with mobile terminals. Distortion caused by picture processing will now be described below using an example of a mobile terminal.

Since it is generally required to reduce the size and the power consumption of a mobile terminal, a camera incorporated in the mobile terminal has limited functions as compared with normal separate cameras. Thus, picture taken by the camera incorporated in the mobile terminal may include mosquito noise and flicker. Further, in the distribution of picture through mobile communication networks, it is common to execute compression processing on picture data from the standpoint of effectively utilizing a transmission band. Hence, the picture often includes flicker, block distortion, aliasing distortion and ringing distortion.

Different distortions included in the picture often lead directly to the evaluation of image quality; and it is needless to say that picture having less distortion is evaluated as having higher quality.

[Non-patent reference 1] "New Edition Sensation/Perception Psychology Handbook" written by Tadashi Oyama, Shogo Imai and Wake Tenji, published by Seishin Shobo, ISBN; 441-4305039, p, 583

SUMMARY OF THE INVENTION

In order to reduce various types of distortion in the vide processing described above, it is considered necessary to execute a large amount of image processing computation. However, on the other hand, when a high-performance CPU capable of executing a large amount of image processing computation is incorporated, there is a concern that the device becomes complicated and the cost of the device is increased. Among others, a mobile terminal is strongly required to prevent the device from being complicated and the cost of the device from being increased, and thus it is actually difficult to incorporate a high-performance CPU.

In view of the foregoing circumstances, the present invention has an object to reduce distortion included in picture and the amount of computation in distortion reduction processing.

In order to achieve the above object, an image processing device according to the present invention includes: image input unit that inputs picture signals comprising a plurality of frame images from outside; processed frame storage unit that stores a processed frame image on which image processing has already been completed; processing pixel group determination unit that determines a to-be-processed pixel group from the plurality of frame images of the picture signals input from the image input unit based on a first predetermined rule and that determines a processed pixel group from the processed frame image stored in the processed frame storage unit based on a second predetermined rule; frequency component processing unit that extracts at least a temporal frequency component from the to-be-processed pixel group and the processed pixel group determined by the processing pixel group determination unit, that executes predetermined coefficient processing on a temporal high-frequency component of the extracted temporal frequency component and that acquires the executed to-be-processed pixel group on which the predetermined coefficient processing has been executed; processing completion frame generation unit that generates a processing completion frame image from the executed to-be-processed pixel group acquired by the frequency component processing unit; and image output unit that outputs to the outside the processing completion frame image generated by the processing completion frame generation unit and that stores, as the processed frame image, the processing completion frame image in the processed frame storage unit, in which the frequency component processing unit prevents the predetermined coefficient processing from being executed on a component having low sensitivity in visual characteristic included in the temporal high-frequency component.

The applicant of the present application conies up with a technique of extracting a temporal frequency component included between a to-be-processed pixel group of input frame images and a processed pixel group of the processed frame images, executing predetermined coefficient processing on a temporal high-frequency component included in the extracted temporal frequency component, and thereby reducing chronological variation included between the to-be-processed pixel group and the processed pixel group and effectively reducing distortion such as flicker.

On the other hand, it is known that the characteristic of human eyes is composed of two different characteristic systems; and the two systems are considered as a transient system that are highly sensitive to the spatial low-frequency component and the temporal high-frequency component of picture, and a continuation system that are highly sensitive to the spatial high-frequency component and the temporal low-frequency component of picture (see non-patent document 1).

In consideration of the above knowledge, the applicant of the present application invented, in executing the predetermined coefficient processing on the temporal high-frequency component, the prevention of executing the predetermined coefficient processing on a "component having low sensitivity in visual characteristic" of the temporal high-frequency component. According to this invention, it is possible to reduce the amount of computation in distortion reduction processing without significantly lowering the effect of reducing distortion included in picture.

The "component having low sensitivity in visual characteristic" described above corresponds to a portion (so to speak a "spatial medium frequency component") obtained by removing the spatial low-frequency component and the spatial high-frequency component from the temporal high-frequency component. Hence, the fact that the predetermined coefficient processing is prevented from being executed on the "component having low sensitivity in visual characteristic" of the temporal high-frequency component can be considered, from a different point of view, as executing the predetermined coefficient processing on, the spatial low-frequency component and the spatial high-frequency component of the temporal high-frequency component.

Therefore, the above-described invention on the image processing device can be described as follows; it is possible for the invention to have the same effects as described above. Specifically, the image processing device according to the present invention includes: image input unit that inputs picture signals comprising a plurality of frame images from outside; processed frame storage unit that stores a processed frame image on which image processing has already been completed; processing pixel group determination unit that determines a to-be-processed pixel group from the plurality of frame images of the picture signals input from the image input unit based on a first predetermined rule and that determines a processed pixel group from the processed frame image stored in the processed frame storage unit based on a second predetermined rule; frequency component processing unit that extracts a spatial frequency component and a temporal frequency component from the to-be-processed pixel group and the processed pixel group determined by the processing pixel group determination unit, that executes predetermined coefficient processing on a spatial low-frequency component and a spatial high-frequency component included in a temporal high-frequency component of the extracted temporal frequency component and that acquires the executed to-be-processed pixel group on which the predetermined coefficient processing has been executed; processing completion frame generation unit that generates a processing completion frame image from the executed to-be-processed pixel group acquired by the frequency component processing unit; and image output unit that outputs to the outside the processing completion frame image generated by the processing completion frame generation unit and that stores, as the processed frame image, the processing completion frame image in the processed frame storage unit.

Here, in order to extract the spatial frequency component and the temporal frequency component, the frequency component processing unit executes spatial frequency transformation on the to-be-processed pixel group and the processed pixel group to extract the spatial frequency component, and executes temporal frequency transformation on the extracted spatial frequency component to extract the temporal frequency component. In this way, it is possible to efficiently extract both the temporal frequency component and the spatial frequency component.

Meanwhile, the processing completion frame generation unit preferably generates the processing completion frame image by combining a plurality of executed to-be-processed pixel groups such that, in plurality of executed to-be-processed pixel groups acquired by the frequency component processing unit, at least one or more pixels are superimposed on each other. In order to generate the processing completion frame image by combining a plurality of executed to-be-processed pixel groups, for example, it is possible to utilize weighting computation, averaging processing or the like. By executing weighting computation to select a higher quality executed to-be-processed pixel group or executing averaging processing to further reduce the distortion as described above, it is possible to generate a processing completion frame image in which distortion is further suppressed.

Furthermore, as an example of the predetermined coefficient processing, processing can be taken in which an absolute value of the frequency component and a predetermined threshold value are compared, and when the absolute value of the frequency component is more than the threshold value, the frequency component is maintained and when the absolute value of the frequency component is not more than the threshold value, a predetermined value is substituted for the frequency component. Furthermore, at this time, zero can be employed as the predetermined value. By substituting the frequency component by zero when the absolute value of the frequency component is not more than the threshold value, as described above, it is possible to remove a small spatial frequency component resulting from encoding distortion or the like and a temporal frequency component responsible for flicker. Consequently, distortion is further reduced.

The above-described invention on the image processing device can be considered as an invention on an image processing method; the invention can be described as follows.

An image processing method according to the present invention executed by an image processing device including processed frame storage unit that stores a processed frame image on which image processing has already been completed, includes: an image input step of inputting picture signals comprising a plurality of frame images from outside; a processing pixel group determination step of determining a to-be-processed pixel group from the plurality of frame images of the picture signals input from the image input unit based on a first predetermined rule and of determining a processed pixel group from the processed frame image stored in the processed frame storage unit based on a second predetermined rule; a frequency component processing step of extracting at least a temporal frequency component from the to-be-processed pixel group and the processed pixel group determined by the processing pixel group determination step, of executing predetermined coefficient processing on a temporal high-frequency component of the extracted temporal frequency component and of acquiring the executed to-be-processed pixel group on which the predetermined coefficient processing has been executed; a processing completion frame generation step of generating a processing completion frame image from the executed to-be-processed pixel group acquired by the frequency component processing step; and an image output step of outputting to the outside the processing completion frame image generated by the processing completion frame generation step and of storing, as the processed frame image, the processing completion frame image in the processed frame storage unit, in which the frequency component processing step prevents the predetermined coefficient processing from being executed on a component having low sensitivity in visual characteristic included in the temporal high-frequency component.

The image processing method according to the present invention can be described as follows. Specifically, an image processing method according to the present invention executed by an image processing device including processed frame storage unit that stores a processed frame image on which image processing has already been completed, includes: an image input step of inputting picture signals comprising a plurality of frame images from outside; a processing pixel group determination step of determining a to-be-processed pixel group from the plurality of frame images of the picture signals input from the image input unit based on a first predetermined rule and of determining a processed pixel group from the processed frame image stored in the processed frame storage unit based on a second predetermined rule; a frequency component processing step of extracting a spatial frequency component and a temporal frequency component from the to-be-processed pixel group and the processed pixel group determined by the processing pixel group determination step, of executing predetermined coefficient processing on a spatial low-frequency component and a spatial high-frequency component included in a temporal high-frequency component of the extracted temporal frequency component and of acquiring the executed to-be-processed pixel group on which the predetermined coefficient processing has been executed; a processing completion frame generation step of generating a processing completion frame image from the executed to-be-processed pixel group acquired by the frequency component processing step; and an image output step of outputting to the outside the processing completion frame image generated by the processing completion frame generation step and of storing, as the processed frame image, the processing completion frame image in the processed frame storage unit.

The above-described invention on the image processing device can be considered as an invention on a computer-readable storage medium for storing an image processing program; the invention can be described as follows.

A computer-readable storage medium for storing an image processing program according to the present invention instructs a computer to function as: image input unit that inputs picture signals comprising a plurality of frame images from outside; processed frame storage unit that stores a processed frame image on which image processing has already been completed; processing pixel group determination unit that determines a to-be-processed pixel group from the plurality of frame images of the picture signals input from the image input unit based on a first predetermined rule and that determines a processed pixel group from the processed frame image stored in the processed frame storage unit based on a second predetermined rule; frequency component processing unit that extracts at least a temporal frequency component from the to-be-processed pixel group and the processed pixel group determined by the processing pixel group determination unit, that executes predetermined coefficient processing on a temporal high-frequency component of the extracted temporal frequency component and that acquires the executed to-be-processed pixel group on which the predetermined coefficient processing has been executed; processing completion frame generation unit that generates a processing completion frame image from the executed to-be-processed pixel group acquired by the frequency component processing unit; and image output unit that outputs to the outside the processing completion frame image generated by the processing completion frame generation unit and that stores, as the processed frame image, the processing completion frame image in the processed frame storage unit, in which the frequency component processing unit prevents the predetermined coefficient processing from being executed on a component having low sensitivity in visual characteristic included in the temporal high-frequency component.

The computer-readable storage medium for storing the image processing program according to the present invention can also be described as follows. Specifically, an image processing program according to the present invention instructs a computer to function as: image input unit that inputs picture signals comprising a plurality of frame images from outside; processed frame storage unit that stores a processed frame image on which image processing has already been completed; processing pixel group determination unit that determines a to-be-processed pixel group from the plurality of frame images of the picture signals input from the image input unit based on a first predetermined rule and that determines a processed pixel group from the processed frame image stored in the processed frame storage unit based on a second predetermined rule; frequency component processing unit that extracts a spatial frequency component and a temporal frequency component from the to-be-processed pixel group and the processed pixel group determined by the processing pixel group determination unit, that executes predetermined coefficient processing on a spatial low-frequency component and a spatial high-frequency component included in a temporal high-frequency component of the extracted temporal frequency component and that acquires the executed to-be-processed pixel, group on which the predetermined coefficient processing has been executed; processing completion frame generation unit that generates a processing completion frame image from the executed to-be-processed pixel group acquired by the frequency component processing unit; and image output unit that outputs to the outside the processing completion frame image generated by the processing completion frame generation unit and that stores, as the processed frame image, the processing completion frame image in the processed frame storage unit.

According to the present invention, it is possible to reduce distortion included in picture and the amount of computation in distortion reduction processing.

BRIEF DESCRIPTION OF THE DRAWINGS

FIG. 5 A conceptual diagram illustrating a first example of positions where frequency coefficients for a 3×3 processing pixel group are processed;

FIG. 6 A conceptual diagram illustrating a second example of the positions where the frequency coefficients for the 3×3 processing pixel group are processed;

FIG. 7 A conceptual diagram illustrating positions where frequency coefficients for a 4×4 processing pixel group are processed;

FIG. 8 A conceptual diagram illustrating positions where frequency coefficients for an 8×8 processing pixel group are processed;

DESCRIPTION OF THE PREFERRED EMBODIMENTS

Figure 1:
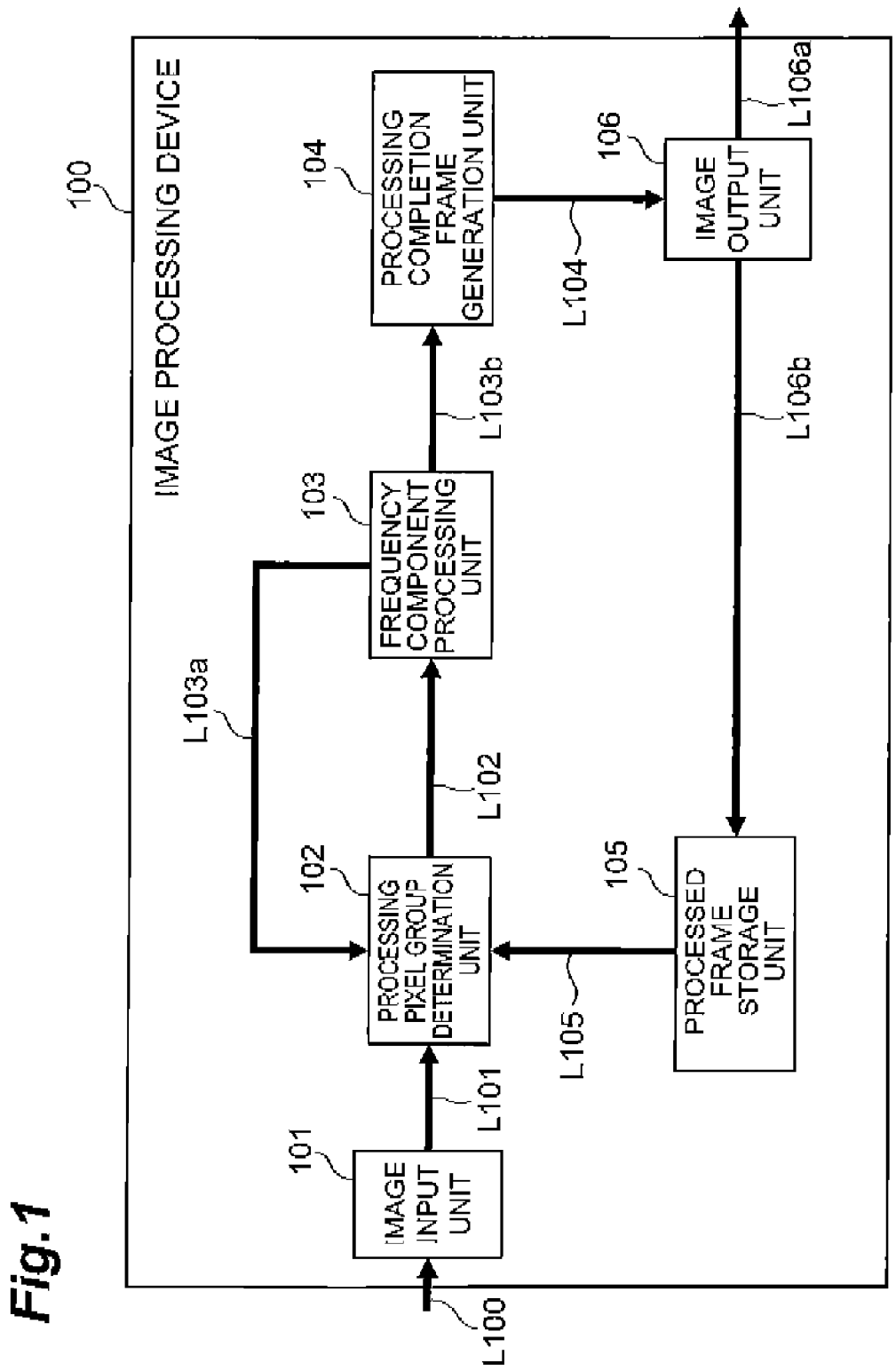
FIG. 1 A block diagram illustrating the configuration of functions of an image processing device according to an embodiment of the present invention.

Embodiments according to the present invention will be described below with reference to the accompanying drawings. In the drawings, the same constituent elements are identified with the same symbols, and their description will not be repeated.

[Configuration of image processing device] FIG. 1 is a block diagram illustrating the configuration of functions of an image processing device 100 according to the present embodiment. This image processing device 100 is formed by a computer that includes, as hardware, a CPU (central processing unit), a storage device for storing an image frame and the like and an input/output device (communication device) for inputting and outputting picture. Meanwhile, the configuration of the hardware will be described later with reference to FIG. 11. This image processing device 100, for example, can be formed by various types of information processing devices that include a stationary communication terminal such as a personal computer and a mobile communication terminal such as a cell phone.

Next, the configuration of functional blocks of the image processing device 100 will be described with reference to FIG. 1. As shown in FIG. 1, the image processing device 100 includes image input unit 101, processing pixel group determination unit 102, frequency component processing unit 103, processing completion frame generation unit 104, processed frame storage unit 105 and image output unit 106. Among them, the image input unit 101 inputs picture signals (moving image signals) comprising a plurality of frame images through a line L100 from the outside.

(The processing pixel group determination unit 102) The processing pixel group determination unit 102 receives through a line L101 the picture signals input by the image input unit 101 from the outside, divides the picture signals into frame images and reads the frame images to be processed (hereinafter referred to as "to-be-processed frames X"). The processing pixel group determination unit 102 reads, among frame images that are stored in the processed frame storage unit 105 and that have been processed (hereinafter referred to as "processed frames Y"), the processed frame Y processed immediately before chronologically (in other words, the most recently processed frame Y) through a line L105.

Figure 2:
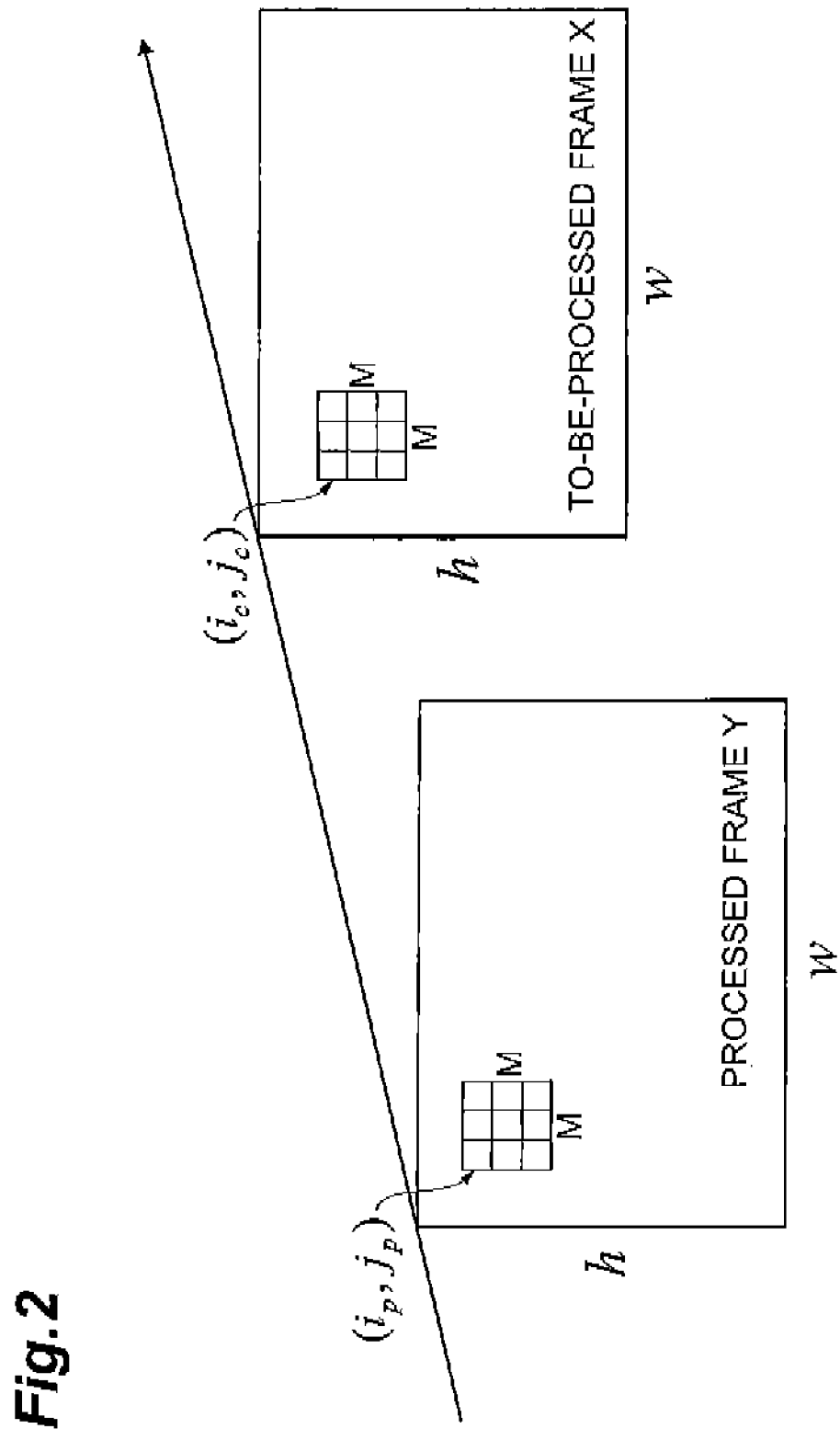
FIG. 2 A conceptual diagram showing the relationship of positions of processing pixel groups.

Then, the processing pixel group determination unit 102 determines an M×M (M is an integer of one or more) pixel group to be processed, from the to-be-processed frames X and the processed frames Y based on the first predetermined rule. The determination method will be specifically described below. Here, as shown in FIG. 2, the horizontal size and the vertical size of the to-be-processed frame X and the processed frame Y are set as w and h, respectively. The processing pixel group determination unit 102 determines, based on the first predetermined rule α, the to-be-processed frame X from a plurality of frame images that have been input, and sequentially determines the M×M pixel group where a pixel position $(i_c, j_c)$ within the to-be-processed frame X is an upper left end, that is, a to-be-processed pixel group $$D_{1(i_c, j_c)} \quad \text{[Formula 1]}$$

(hereinafter also referred to a "to-be-processed pixel group $D_1$"). In other words, an upper left end pixel position $(i_c, j_c)$ in the M×M pixel group sequentially varies within the range of $(0 \le i_c \le w-M)$ and $(0 \le j_c \le h-M)$, and thus the to-be-processed pixel group $D_1$ is sequentially determined. Here, when the position within the to-be-processed pixel group $D_1$ is assumed to be (ii, jj), the to-be-processed pixel group $D_1$ corresponding to the above position (ii, jj) within the to-be-processed frame X is expressed as follows.

$$D_{1(i_c,j_c)}(ii,jj)=X(i_c+ii,j_c+jj)(0 \le ii<M, 0 \le jj<M) \quad \text{[Formula 2]}$$

Moreover, the processing pixel group determination unit 102 sequentially determines, based on a predetermined standard β (the second predetermined rule), the M×M pixel group where a pixel position $(i_p, j_p)$ $(0 \le i_p \le w-M, 0 \le j_p \le h-M)$ within the processed frames Y is an upper left end, that is, a processed pixel group $$D_{2(i_p, j_p)} \quad \text{[Formula 3]}$$

(hereinafter also referred to a "processed pixel group $D_2$"). Specifically, the M×M pixel group where the position of the upper left end pixel coincides with that of the upper left end pixel in the to-be-processed pixel group $D_1$ is determined to be the processed pixel group $D_2$. Here, when the position within the processed pixel group $D_2$ is assumed to be (ii, jj), the processed pixel group $D_2$ corresponding to the above position (ii, jj) within the processed frame Y is expressed as follows.

$$D_{2(i_p, j_p)}(ii,jj)=Y(i_p+ii,j_p+jj)(0 \le ii<M, 0 \le jj<M) \quad \text{[Formula 4]}$$

Then, to-be-processed pixel group $D_1$ and the processed pixel group $D_2$ determined by the processing pixel group determination unit 102 are output through a line L102 to the frequency component processing unit 103.

Mean while, each time the processing pixel group determination unit 102 receives, from the frequency component processing unit 103, a completion signal on the processing of the to-be-processed pixel group $D_1$ where a pixel position is an upper left end, the to-be-processed pixel group $D_1$ and the processed pixel group $D_2$ are determined. In other words, after receiving a processing completion signal from the frequency component processing unit 103, the processing pixel group determination unit 102 sequentially proceeds to execute processing so as to determine a to-be-processed pixel group $$D_{1(i_c+1, j_c)} \quad \text{[Formula 5]}$$

where a pixel position $(i_c+1, j_c)$ is an upper left end, and executes the processing up to a to-be-processed pixel group $D_{1(w-M, h-M)}$ where a pixel position (w−M, h−M) is an upper left end. The to-be-processed frame is each frame image that has been input. In the present embodiment, it is assumed that M=3, and the processing for determining the to-be-processed pixel group $D_1$ will be described (Determination of Position of the to-be-Processed Pixel Group $D_1$)

Figure 3:
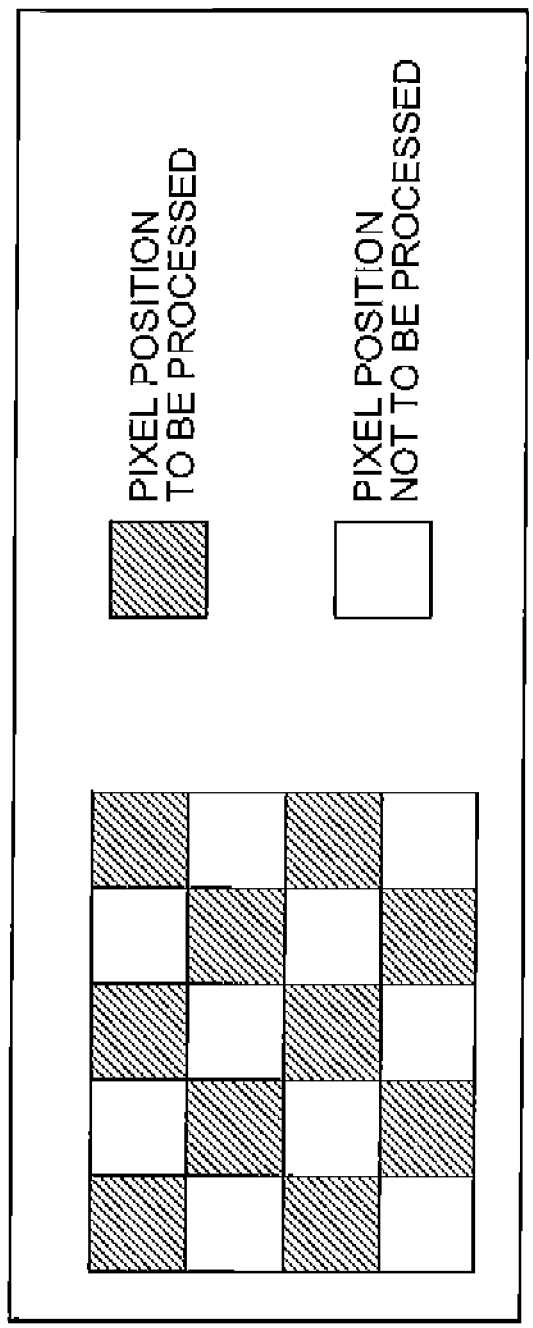
FIG. 3 A conceptual diagram showing pixel positions on which processing within a to-be-processed frame is executed.

Although, in the present embodiment, the rule α on the determination of the processing pixel position within the to-be-processed frame X is such that the to-be-processed pixel group $D_1$ is sequentially determined for all the pixels present in the to-be-processed frame X, the to-be-processed pixel group $D_1$ may be determined according to other rule. For example, a rule may be used under which the pixel position at the upper left end in the M×M pixel group is determined every two pixels and the to-be-processed pixel group $D_1$ is determined, for example, in a checkered pattern as shown in FIG. 3. The to-be-processed pixel group $D_1$ may be sequentially determined by a parallel operation starting from a plurality of points within the image. A different rule may be employed as the rule α for each of the to-be-processed frames.

Although, as the rule α used in the present embodiment, an example is indicated in which all the to-be-processed frames input from the image input unit 101 are selected, the present invention is not limited to this. For example, the frame image that is input as the to-be-processed frame from the image input unit 101 may be selected every two frame images or every more than one frames. Moreover, in order to determine this selection method, it is possible to refer to as the features of picture, the size of movement, an average brightness, a contrast and the like.

(Determination of position of the processed pixel group $D_2$) Meanwhile, although, in the present embodiment, the standard β on the determination of the processing pixel position within the processed frame Y is such that the processed pixel group $D_2$ at the same position as the to-be-processed pixel group $D_1$ is determined, the processed pixel group $D_2$ may be determined based on other standards. For example, as with a movement search utilized in a moving image encoding prediction technology, the processed pixel group $D_2$ may be determined in which the position where evaluation values (such as SAD or SSD) based on the difference between the to-be-processed pixel group $D_1$ and the pixel signal are minimal is an upper left end. The processed pixel group $D_2$ may be determined in which the position where an evaluation value other than the above-mentioned evaluation values is minimal is an upper left end.

(Shape of the to-be-processed pixel group $D_1$ and the processed pixel group $D_2$) Although, in the present embodiment, the to-be-processed pixel group $D_1$ and the processed pixel group $D_2$ are expressed in an M×M two-dimensional matrix, they may be expressed by a method other than such, a method. For example, they may be expressed as a $M^2 \times 1$ one-dimensional vector. Moreover, although, in the present embodiment, the to-be-processed pixel group $D_1$ and the processed pixel group $D_2$ in the shape of a square (M×M) are selected, a pixel group in a shape other than the square may be selected. For example, a K×L (K≠L>0) pixel group may be determined. Further, a pixel group that is not in the shape of a quadrangle may be determined by selecting pixels obliquely.

(Commonality of the to-be-processed pixel group $D_1$ and the processed pixel group $D_2$) Although, in the present embodiment, the pixel groups having the same shape and position are determined to be the to-be-processed pixel group $D_1$ and the processed pixel group $D_2$, pixel groups having different shapes may be determined to be the to-be-processed pixel group $D_1$ and the processed pixel group $D_2$ or the to-be-processed pixel group $D_1$ and the processed pixel group $D_2$ may be determined based on different determination standards.

(Selection of the processed frame) Although, in the present embodiment, the processed frame immediately preceding the to-be-processed frame X is selected as the processed frame Y, a frame other than it may be processed. Although, in the present embodiment, one frame is selected as the processed frame Y, and the processed pixel group is selected from the processed frame Y, the processed pixel group may be selected from a plurality of frames stored in the processed frame storage unit 105.

Figure 4:
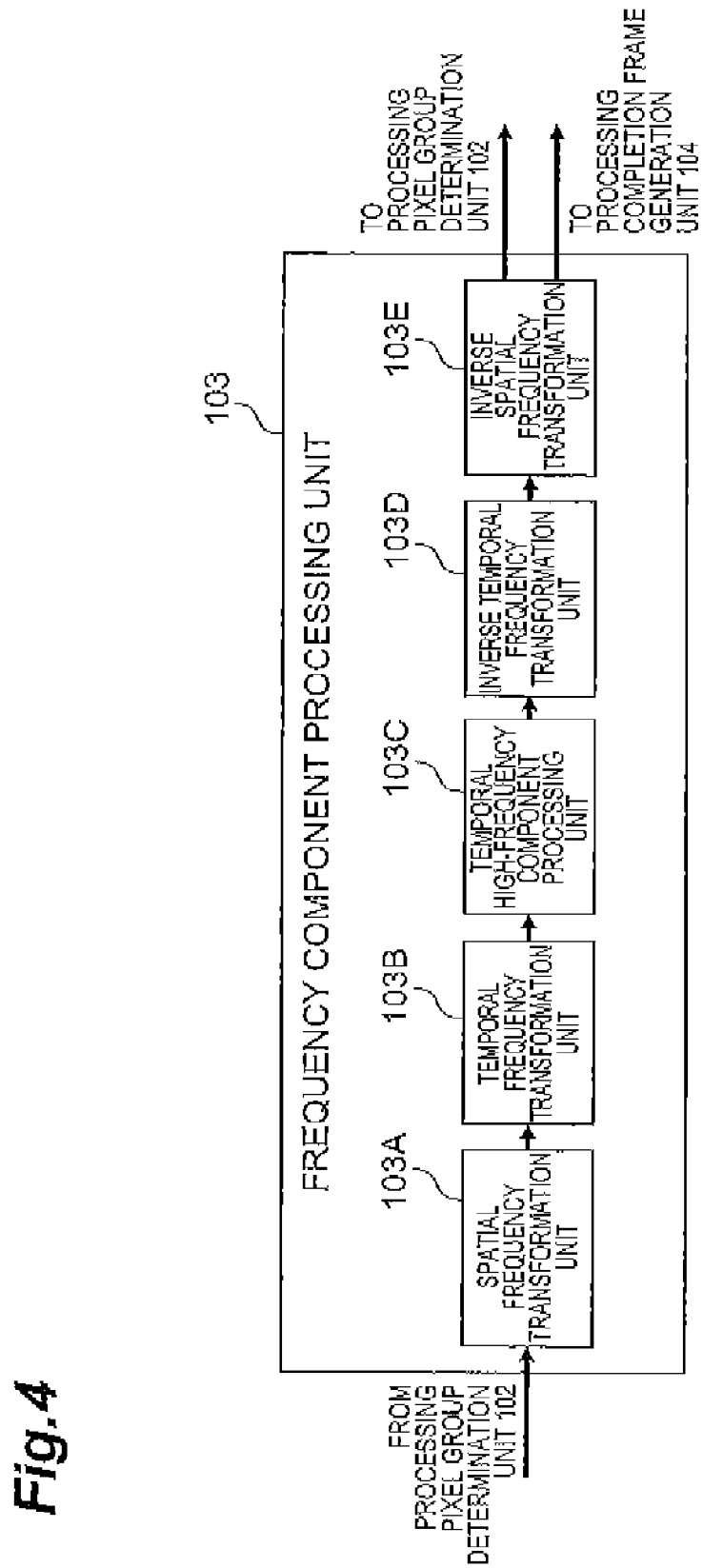
FIG. 4 A block diagram illustrating the configuration of frequency component processing unit shown in FIG. 1.

(The frequency component processing unit 103) The configuration of functional blocks of the frequency component processing unit 103 will now be described with reference to FIG. 4. As shown in FIG. 4, the frequency component processing unit 103 includes spatial frequency transformation unit 103A, temporal frequency transformation unit 103B, temporal high-frequency component processing unit 103C, inverse temporal frequency transformation unit 103D and inverse spatial frequency transformation unit 103E.

The spatial frequency transformation unit 103A receives a 3×3 pixel to-be-processed pixel group $D_1$ and a 3×3 pixel processed pixel group $D_2$ determined by the processing pixel group determination unit 102, executes spatial frequency transformation on these to-be-processed pixel group $D_1$ and processed pixel group $D_2$ and acquires, for the to-be-processed pixel group $D_1$, a spatial frequency transformation coefficient $$f_{1(i_c,j_c)}$$ [Formula 6]

(hereinafter also referred to a "spatial frequency transformation coefficient $f_1$") and, for the to-be-processed pixel group $D_2$, a spatial frequency transformation coefficient $$f_{2(i_p,j_p)}$$ [Formula 7]

(hereinafter also referred to a "spatial frequency transformation coefficient $f_2$"). Specifically, the following DCT transformation is executed by utilizing a transformation base $H_1$. The following formula represents positions (ii, jj) within the pixel groups $D_1$ and $D_2$.

$$H_1 = \begin{bmatrix} 1 & 1 & 1 \\ 1 & 0 & -1 \\ 1 & -2 & 1 \end{bmatrix}$$ [Formula 8]

$$f_{1(i_c,j_c)} = H_1 \times D_{1(i_c,j_c)} \times H_1^T$$

$$f_{2(i_c,j_c)} = H_1 \times D_{2(i_p,j_p)} \times H_1^T$$

The spatial frequency transformation coefficients $f_1$ and $f_2$ thus acquired are output from the spatial frequency transformation unit 103A to the temporal frequency transformation unit 103B.

The temporal frequency transformation unit 103B executes the temporal frequency transformation on the spatial frequency transformation coefficients $f_1$ and $f_2$, and transforms them into a temporal low-frequency component $tf_L$, and a temporal high-frequency component $tf_H$. In the present embodiment, Harr transformation using the following transformation base $J_1$ is used as the temporal frequency transformation, and thus the temporal frequency transformation is executed.

$$J_1 = \frac{1}{\sqrt{2}} \begin{bmatrix} 1 & 1 \\ 1 & -1 \end{bmatrix}$$ [Formula 9]

$$\begin{bmatrix} tf_L(ii,jj) \\ tf_H(ii,jj) \end{bmatrix} = J_1 \times \begin{bmatrix} f_{1(i_c,j_c)}(ii,jj) \\ f_{2(i_p,j_p)}(ii,jj) \end{bmatrix}$$

(ii, jj = 0, 1, 2)

The temporal low-frequency component $tf_L$ and the temporal high-frequency component $tf_H$ obtained by the above temporal frequency transformation are output from the temporal frequency transformation unit 103E to the temporal high-frequency component processing unit 103C.

Figure 5:
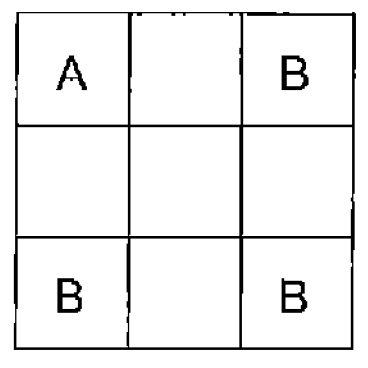

The temporal high-frequency component processing unit 103C executes, in a coefficient corresponding to the temporal high-frequency component $tf_H$, predetermined coefficient processing γ on a coefficient indicating a spatial low-frequency component (DC component) corresponding to a position A shown in FIG. 5 and a spatial high-frequency component corresponding to a position B. The processing is not executed on the temporal low-frequency component $tf_L$.

Specifically, the temporal high-frequency component processing unit 103C executes the following coefficient processing using a previously stored threshold value Th, and acquires a processed temporal high-frequency component $tf_H'$.

$$tf_H'(ii,jj) = \begin{cases} tf_H(ii,jj) & (|tf_H(ii,jj)| > Th) \\ 0 & (|tf_H(ii,jj)| \leq Th) \end{cases}$$ [Formula 10]

After the coefficient processing is completed, the acquired processed temporal high-frequency component $tf_H'$ and the temporal low-frequency component $tf_L$ are output to the inverse temporal frequency transformation unit 103D.

The inverse temporal frequency transformation unit 103D executes inverse Haar transformation on the temporal low-frequency component $tf_L$ and the processed temporal high-frequency component $tf_H'$ by multiplying $J_1^{-1}$. Furthermore, the inverse spatial frequency transformation unit 103E executes spatial inverse frequency transformation (inverse DCT transformation) by utilizing a transformation base $G_1$.

In this way, the to-be-processed pixel group $$D'_{1(i_c, j_c)}$$ [Formula 11]

(hereinafter also referred to an "executed to-be-processed pixel group D'$_1$") in which the predetermined coefficient processing is executed on the temporal high-frequency component is acquired, and the processing of the frequency component processing unit 103 is completed. The inverse spatial frequency transformation unit 103E executes spatial inverse frequency transformation (inverse DOT transformation) by utilizing the following transformation, base G$_1$.

$$\begin{bmatrix} f'_{1(i_c, j_c)}(ii, jj) \\ f'_{2(i_p, j_p)}(ii, jj) \end{bmatrix} = \begin{bmatrix} tf_L(ii, jj) \\ tf'_H(ii, jj) \end{bmatrix} \times J_1^{-1}$$ [Formula 12]

$$G_1 = \begin{bmatrix} 2 & 2 & 2 \\ 3 & 0 & -3 \\ 1 & -2 & 1 \end{bmatrix}$$

$$D'_1 = G_1 \times f'_{1(i_c, j_c)} \times G_1^T$$

The frequency component processing unit 103 outputs the executed to-be-processed pixel group D'$_1$ acquired by the inverse spatial frequency transformation to the processing completion frame generation unit 104 through a line L103*b*, and outputs it to the processing pixel group determination unit 102 through a line L103*a*.

Thereafter, the frequency component processing unit 103 repeats the above processing until a frame processing completion signal comes from the processing pixel group determination unit 102, Then, when the frequency component processing unit 103 receives the frame processing completion signal, the frequency component processing unit 103 outputs a combination processing start signal to the processing completion frame generation unit 104 through the line L103*b*.

(Timing of the combination processing start signal) Although the present embodiment deals with the example where the combination processing start signal is output to the processing completion frame generation unit 104 when the frequency component processing unit 103 receives the frame processing completion signal, the present invention is not limited to this example. For example, the combination processing start signal for the pixel position (i$_c$, j$_c$) may be output when processing of the processing pixel group including the pixel position (i$_c$, j$_c$) is completed, or it may be output when processing for a column is completed.

(To be spatial-frequency transformed) Although, in the present embodiment, the spatial frequency transformation is executed directly on the to-be-processed pixel group, the spatial frequency transformation may be executed after the pixel processing is executed. For example, the spatial frequency transformation may be executed after an average brightness adjustment, filter processing or the like is executed.

(Dimension of the frequency transformation) Although, in the present embodiment, the two-dimensional spatial frequency transformation is utilized, the two-dimensional spatial frequency transformation coefficient may be acquired by repeating a one-dimensional spatial frequency transformation.

(Other spatial frequency transformations) Although, in the present embodiment, the DCT transformation is utilized as the spatial frequency transformation, other spatial frequency transformation may be utilized. For example, when a 4×4 processing pixel group is used, Hadamard transformation using the following transformation base H$_2$ may be utilized. Furthermore, a spatial frequency transformation coefficient may be acquired by utilizing frequency transformation other than the above transformation. Moreover, in order to reduce the amount of computation, frequency transformation that omits normalization process may be executed.

$$H_2 = \begin{bmatrix} 1 & 1 & 1 & 1 \\ 1 & -1 & 1 & -1 \\ 1 & 1 & -1 & -1 \\ 1 & -1 & -1 & 1 \end{bmatrix}$$ [Formula 13]

When the Hadamard transformation is utilized as the spatial frequency transformation, the above transformation base H$_2$ only has to be utilized for the transformation base G$_1$ of the inverse transformation.

(Processing on the special frequency coefficient) Although, in the present embodiment, the Harr transformation is executed on the special frequency transformation coefficient, and thereafter executes coefficient processing, predetermined coefficient processing may be executed on the special frequency transformation coefficient before the Harr transformation is executed. For example, the above-described coefficient processing γ may be executed on the spatial frequency transformation coefficient f$_1$ and the spatial frequency transformation coefficient f$_2$. Processing different from the coefficient processing γ, which is executed on the temporal frequency component, may be executed, or processing different in position may be executed. In this case, as the threshold value Th used for the processing, a threshold value different from that utilized for the temporal frequency component may be utilized. Processing for another coefficient may be executed.

(Acquisition of the temporal frequency transformation) Although, in the present embodiment, the temporal high-frequency components of the to-be-processed pixel group D$_1$ and the processed pixel group D$_2$ are acquired by executing the spatial frequency transformation and then executing the Harr transformation, they may be acquired by a method other than such a method. For example, Fourier transformation, DCT transformation, wavelet transformation or the like may be utilized. Alternatively, the sum of the to-be-processed pixel group D$_1$ and the processed pixel group D$_2$ is simply acquired as the temporal low-frequency component, and the difference between the to-be-processed pixel group D$_1$ and the processed pixel group D$_2$ may be acquired as the temporal high-frequency component.

Although, in the present embodiment, the temporal frequency component is acquired by executing the spatial frequency transformation and utilizing the acquired spatial frequency component, the temporal frequency component may be directly acquired without the spatial frequency transformation being executed. For example, the temporal frequency component may be acquired by directly executing the frequency transformation such as DCT transformation, wavelet transformation or the like in the time direction of the processing pixel group. In this case, the frequency component processing unit 103 does not need the spatial frequency transformation unit 103A and the inverse spatial frequency transformation unit 103E; the frequency component processing unit 103 only has to be comprising the temporal frequency transformation unit 103B, the temporal high-frequency component processing unit 103C and the inverse temporal frequency transformation unit 103D.

Figure 6:
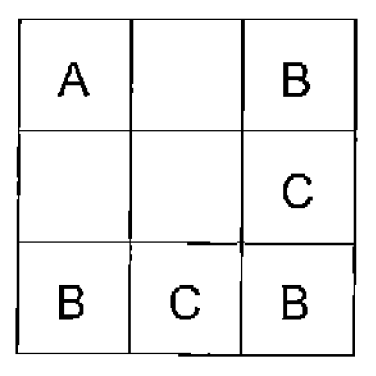

(Position of the temporal frequency component coefficient) Although, in the present embodiment, the position of the processing coefficient for the temporal high-frequency component tf$_H$ is set at the position A corresponding to the spatial low-frequency component (DC component) and the position B corresponding to the spatial high-frequency component, a coefficient at a position other than those positions may be processed. For example, in addition to the position A and the position B, a coefficient corresponding to a temporal frequency component at a position C shown in FIG. 6 may be processed.

Figure 7:
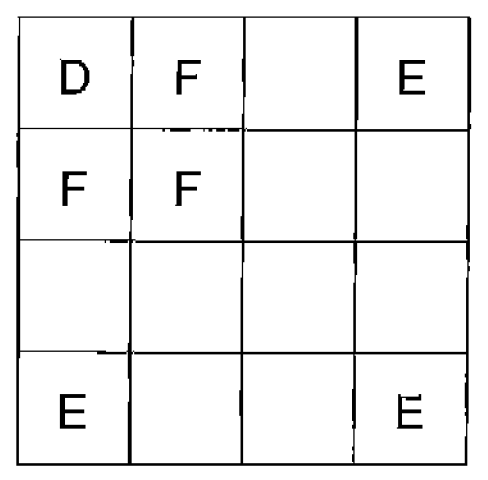

For example, when M=4, the coefficients at a position D and a position E shown in FIG. 7 only have to be processed. Moreover, in addition to the position D and the position E, a coefficient at a position F may be processed.

Figure 8:
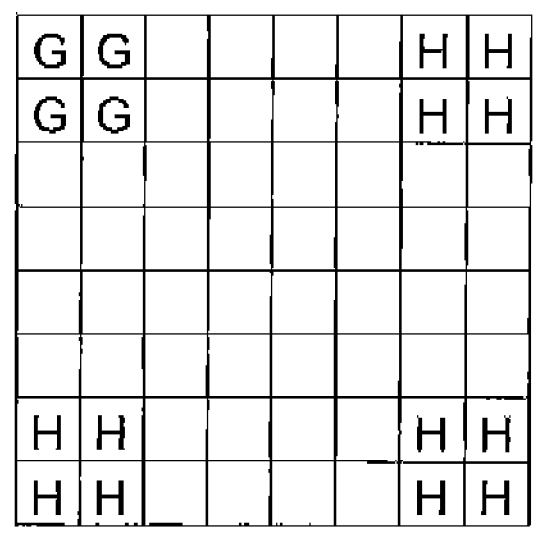

Furthermore, for example, when M=8, as shown in FIG. 8. coefficients at a position G and a position H may also be processed. Moreover, part of the coefficients at the position G and the position H may be processed.

(Threshold value Th) Although, in the present embodiment, the threshold value Th is previously stored, it may be input from outside. The threshold value Th may be determined based on the process of this processing. Alternatively, the threshold value Th may be determined based on results obtained by the image analysis of the amount of difference between images, distribution values and the like. The threshold value Th may also be determined based on a quantization value that is information utilized by, for example, moving image encoding processing unit, the bit rate of compressed information or the like.

(Predetermined coefficient processing γ) Although, in the present embodiment, the processing based on the comparison with the threshold value Th is executed as the predetermined coefficient processing γ, other processing may be executed. For example, as with the following formula (a), when the absolute value of the frequency component is the threshold value Th or less, the substitution of an arbitrarily value p may be executed. As with the following formula (b), a coefficient in which the absolute value of the frequency component is the threshold value Th or less may be divided by a coefficient q. When the division is executed by the division coefficient q, the division coefficient q may be varied according to the position (ii, of the frequency component. For example, setting may be executed such that, as (ii+jj) increases, the division coefficient q increases. Processing in which a threshold value is not utilized may be executed. For example, a coefficient at a predetermined position may be divided by a coefficient r(r≠0).

[Formula 14]

$$tf'_H(ii, jj) = \begin{cases} tf_H(ii, jj) & (|tf_H(ii, jj)| > Th) \\ p & (|tf_H(ii, jj)| \leq Th) \end{cases} \quad (a)$$

$$tf'_H(ii, jj) = \begin{cases} tf_H(ii, jj) & (|tf_H(ii, jj)| > Th) \\ tf_H(ii, jj)/q & (|tf_H(ii, jj)| \leq Th) \end{cases} \quad (b)$$

(Temporal frequency component to be processed) Although, in the present embodiment, in order to effectively reduce flicker and the like produced between the frames of picture, the predetermined coefficient processing is executed on only the temporal high-frequency component tf$_H$, the predetermined coefficient processing (for example, the above coefficient processing γ) may be executed on the temporal low-frequency component tf$_L$. In that case, it is not necessary to execute the same processing on the temporal low-frequency component tf$_L$, and the temporal high-frequency component tf$_H$. For example, coefficient processing at different positions may be executed on the temporal low-frequency component tf$_L$ and the temporal high-frequency component tf$_H$.

(Processing completion frame generation unit 104) With reference back to FIG. 1, the processing completion frame generation unit 104 receives the combination processing start signal from the frequency component processing unit 103 through the line L103b, and thereafter executes the combination processing on the executed to-be-processed pixel group $$D'_{1(ix,jx)} \quad \text{[Formula 15]}$$

Specifically, after the completion of the inverse frequency transformation of n to-be-processed pixel groups D'$_{1(ix,jx)}$ including a pixel at a pixel position (i$_c$, j$_c$), the pixel at the pixel position (i$_c$, j$_c$) is calculated by weighting addition processing indicated by the following formula, and a processing completion frame y is generated, A pixel position (ix, jx) indicates an upper left end position of a processing pixel group including the pixel at the pixel position (i$_c$, j$_c$). Here, as a weight utilized for the weighting addition processing, a coefficient for the processing pixel group in which the pixel position (ix, jx) is an upper left end is assumed to be weight$_{(ix, jx)}$, and this coefficient is assumed to be previously prepared.

$$y(i_c, j_c) = \sum_{ix,jx}^{n} (\text{weight}_{(ix,jx)} \times D'_{1(ix,jx)}(i_c, j_c)) \Big/ \sum_{ix,jx}^{n} \text{weight}_{(ix,jx)} \quad \text{[Formula 16]}$$

Then, the processing completion frame generation unit 104 generates all the pixels of the processing completion frame y, and thereafter outputs the generated processing completion frame y to the image output unit 106 through a line L104. The image output unit 106 outputs the generated processing completion frame y to the outside through a line L106a, also outputs the processing completion frame y to the processed frame storage unit 105 through a line L106b and stores the processing completion frame y, as the processed frame, in the processed frame storage unit 105 in order to utilize it for the subsequent processing (Substitute for the weighting computation) Although the weighting addition is utilized to generate the processing completion frame y, other processing may be executed. For example, processing such as simple averaging may be utilized. Without the processing such as the weighting addition being executed, the processing completion frame y may be generated by utilizing a pixel itself output from the frequency component processing unit 103.

(Weighting coefficient) Although, in the present embodiment, the previously prepared weighting coefficient weight$_{(ix, jx)}$ is utilized, the weighting coefficient weight$_{(ix, jx)}$ may be determined by a method other than the above method. For example, a weighting coefficient weight$_{(ix, jx)}$ may be determined that is previously adjusted to have a high objective evaluation index for various types of picture. The weighting coefficient weight$_{(ix, jx)}$ may be determined by other evaluation results determined in the process of image processing. For example, the weighting coefficient weight$_{(ix, jx)}$ may be determined based on the number of coefficients on which to execute the coefficient processing or the results of other processing.

(The amount of processing pixel group on the weighting addition) Although, in the present embodiment, the processing completion frame y is generated by using all the processing pixel groups including the pixel position $(i_c, j_c)$, it is not necessary to use all the processing pixel groups. For example, a processing pixel group that satisfies a given standard may only be added, Only a processing pixel group in which the weighting coefficient weight$_{(ix, jx)}$ is set large and which is placed in an upper position may be added. In that case, in the coefficient processing γ, a predetermined number of processing pixel groups in which a larger number of coefficients are processed may be selected and added.

(Timing of the weighting addition processing) Although, in the present embodiment, the combination processing is executed on the processing pixel groups on which the spatial frequency transformation has been executed, the processing completion frame y may be acquired by executing the weighting addition processing before the spatial frequency transformation and thereafter executing the spatial frequency transformation.

(Substitute computation for the division) Although, in, the present embodiment, the division is executed using the weighting coefficient weight$_{(ix, jx)}$, other processing may be executed. For example, processing equivalent to the division may be achieved by previously preparing an external reference table and dividing a coefficient based on the weighting coefficient weight$_{(ix, jx)}$.

(Definition of the pixels) The processing for the pixels in the present embodiment can be applied to color components such as ROB or YUV. In particular, when an image is composed of YUV components, the above processing may be executed on (Y) for brightness signals alone. In that case, other processing may be executed on (UV), which are color-difference components. For example, simple filter processing such as a smoothing filter may be utilized.

Figure 9:
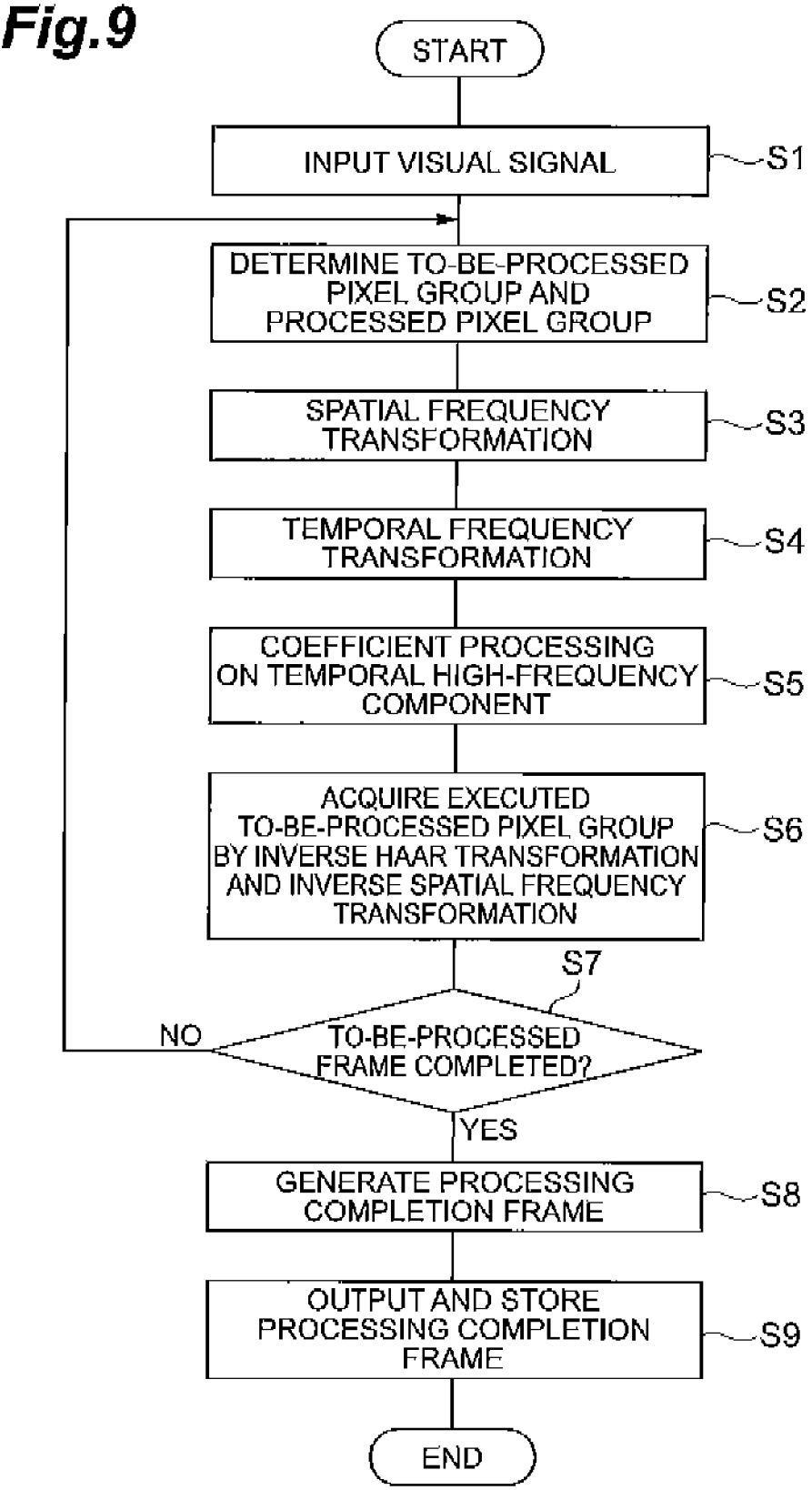
FIG. 9 A flowchart showing the flow of image processing in the embodiment of the present invention.

[Image processing in the image processing device] The image processing executed by the image processing device 100 of the present embodiment will now be described based on FIG. 9.

The image input unit 101 inputs picture signals (moving image signals) comprising a plurality of frame images from the outside (step S1).

Then, the processing pixel group determination unit 102 divides the input picture signals into the frame images, reads the to-be-processed frame X based on the first predetermined rule and determines the M×M (M is an integer of one or more) to-be-processed pixel group D$_1$ (step S2). Simultaneously, the processing pixel group determination unit 102 reads, among the processed frame images that are stored in the processed frame storage unit 105, the processed frame Y processed immediately before chronologically based on the second predetermined rule, and determines the M×M (M is an integer of one or more) processed pixel group D$_2$ (step 32). The determination procedure in step S2 is described above. The to-be-processed pixel group D$_1$ and the processed pixel group D$_2$ obtained in step S2 are fed to the frequency component processing unit 103.

Then, the spatial frequency transformation unit 103A of the frequency component processing unit 103 receives the to-processed pixel group D$_1$ and the processed pixel group D$_2$, executes the spatial frequency transformation on the to-be-processed pixel group D$_1$ and the processed pixel group D$_2$ and acquires the spatial frequency transformation coefficient f$_1$ for the to-be-processed pixel group D$_1$ and the spatial frequency transformation coefficient f$_2$ for the processed pixel group D$_2$ (step S3).

Then, the temporal frequency transformation unit 103B executes the temporal frequency transformation on the spatial frequency transformation coefficients f$_1$ and f$_2$, transforms them into the temporal low-frequency component tf$_L$, and the temporal high-frequency component tf$_H$ (step S4). For example, the temporal frequency transformation is executed with Harr transformation using the above transformation base J$_1$.

Then, the temporal high-frequency component processing unit 103C executes, in a coefficient corresponding to the temporal high-frequency component tf$_H$, the predetermined coefficient processing γ on a coefficient indicating a spatial low-frequency component (DC component) and a spatial high-frequency component (step S5), In other words, in the coefficient corresponding to the temporal high-frequency component tf$_H$, the predetermined coefficient processing γ is prevented from being executed on a coefficient indicating the frequency component (so to speak, a medium-frequency component) obtained by removing the spatial low-frequency component and the spatial high-frequency component.

Then, the inverse temporal frequency transformation unit 103D executes inverse Haar transformation on the temporal low-frequency component tf$_L$ and the processed temporal high-frequency component tf$_H$' by multiplying J$_1^{-1}$. Furthermore, the inverse spatial frequency transformation unit 103E executes inverse spatial frequency transformation (inverse DCT transformation) by utilizing a transformation base G$_1$. Thus, the to-be-processed pixel group (executed to-be-processed pixel group D'$_1$) in which the predetermined coefficient processing has been executed on the temporal high-frequency component is acquired (step S6).

Thereafter, the processing in steps S2 to S6 described above is repeatedly executed until the processing of the to-be-processed frame X is completed (step S7).

Then, when the processing of the to-be-processed frame X is completed (yes in step S7), the processing completion frame generation unit 104 executes the combination processing on the executed to-be-processed pixel group to generate the processing completion frame y (step S8). Then, all the pixels of the processing completion frame y are generated, and thereafter the generated processing completion frame y is output to the image output unit 106.

Then, the image output unit 106 outputs the generated processing completion frame y both to the outside and to the processed frame storage unit 105, and stores, as the processed frame, the processing completion frame y in the processed frame storage unit 105 in order to utilize it for the subsequent processing (step S9).

Effects of the Present Embodiment

As described above, the image processing device 100 of the present embodiment extracts the temporal frequency component included between the to-be-processed pixel group of the input frame images and the processed pixel group of the processed frame images, executes the predetermined coefficient processing on the temporal high-frequency component in the extracted temporal frequency component and thereby reduces chronological variation included between the to-be-processed pixel group and the processed pixel group, with the result that distortion such as flicker can be effectively reduced. On the other hand, the predetermined coefficient processing is prevented from being executed on parts (that is, components having low sensitivity in visual characteristic) obtained by removing the spatial low-frequency component and the spatial high-frequency component in the temporal high-frequency component. In this way, it is possible to reduce the amount of computation in distortion reduction processing while preventing the effect of reducing distortion included in picture from being significantly lowered.

Figure 10:
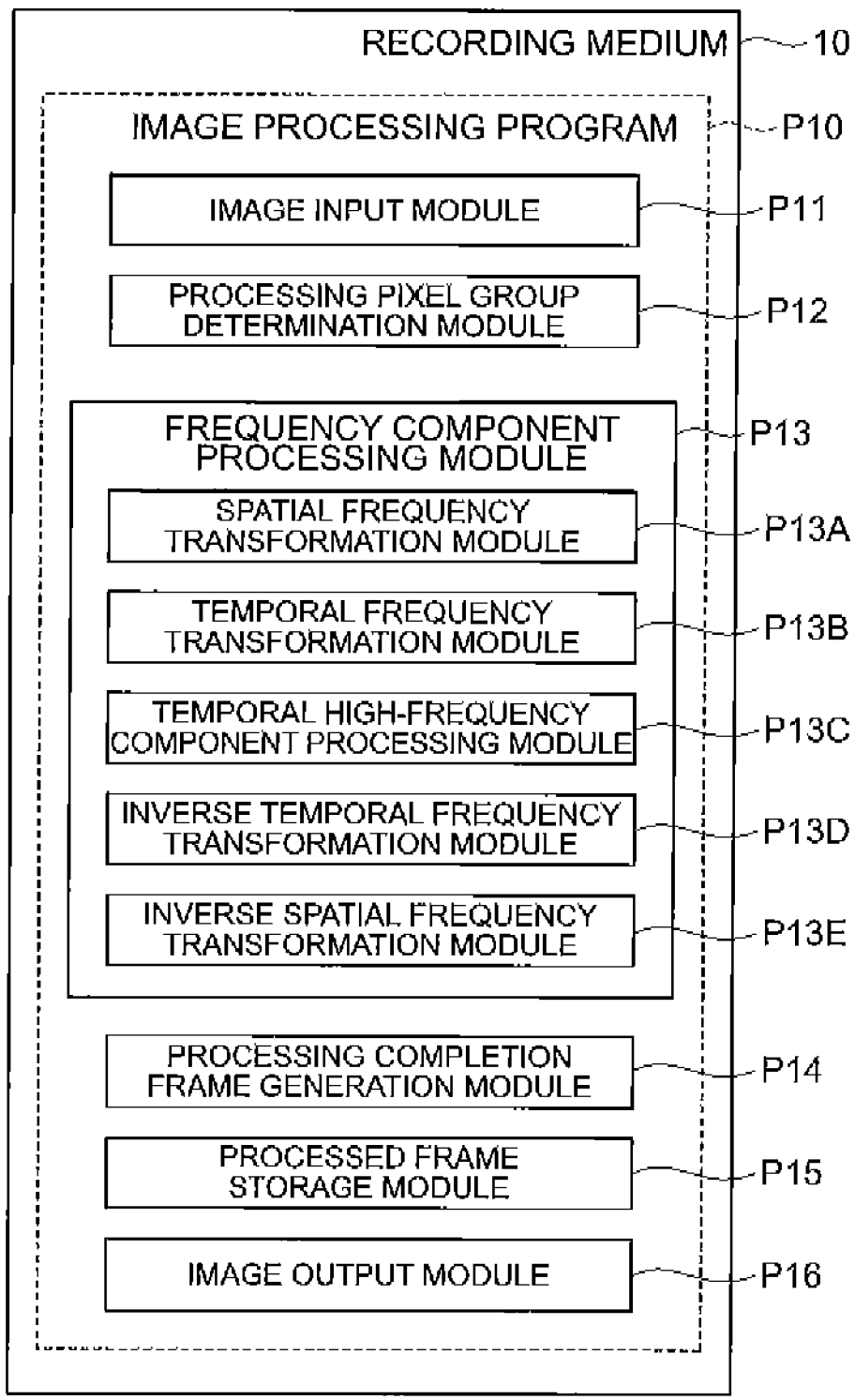
FIG. 10 A block diagram illustrating the configuration of an image processing program.

[Image processing program] An image processing program for operating a computer as the image processing device of the present invention will now be described. FIG. 10 is a diagram showing the configuration of an image processing program P10 stored in a recording medium 10. The recording medium 10 can be formed with a recording medium such as a flexible disc, a CD-ROM, a DVD or a ROM, a semiconductor memory or the like.

As shown in FIG. 10, the image processing program P10 includes an image input module P11, a processing pixel group determination module P12, a frequency component processing module P13, a processing completion frame generation module P14, a processed frame storage module P15 and an image output module P16. The image input module P11 achieves the function of the image input unit 101 of FIG. 1; the processing pixel group determination module P12 achieves the function of the processing pixel group determination unit 102; the frequency component processing module P13 achieves the function of the frequency component processing unit 103; the processing completion frame generation modulo P14 achieves the function of the processing completion frame generation unit 104; the processed frame storage module P15 achieves the function of the processed frame storage unit 105; and the image output module P16 achieves the function of the image output unit 106.

The frequency component processing module P13 includes, as sub-modules, a spatial frequency transformation module P13A, a temporal frequency transformation module P13B, a temporal high-frequency component processing module P13C, an inverse temporal frequency transformation module P13D, and an inverse spatial frequency transformation module P13E. The spatial frequency transformation module P13A achieves the function of the spatial frequency transformation unit 103A of FIG. 4; the temporal frequency transformation module P13B achieves the function of the temporal frequency transformation unit 103B; the temporal high-frequency component processing module P13C achieves the function of the temporal high-frequency component processing unit 103C; the inverse temporal frequency transformation module P13D achieves the function of the inverse temporal frequency transformation unit 103D; and the inverse spatial frequency transformation module P13E achieves the function of the inverse spatial frequency transformation unit 103E.

Figure 11:
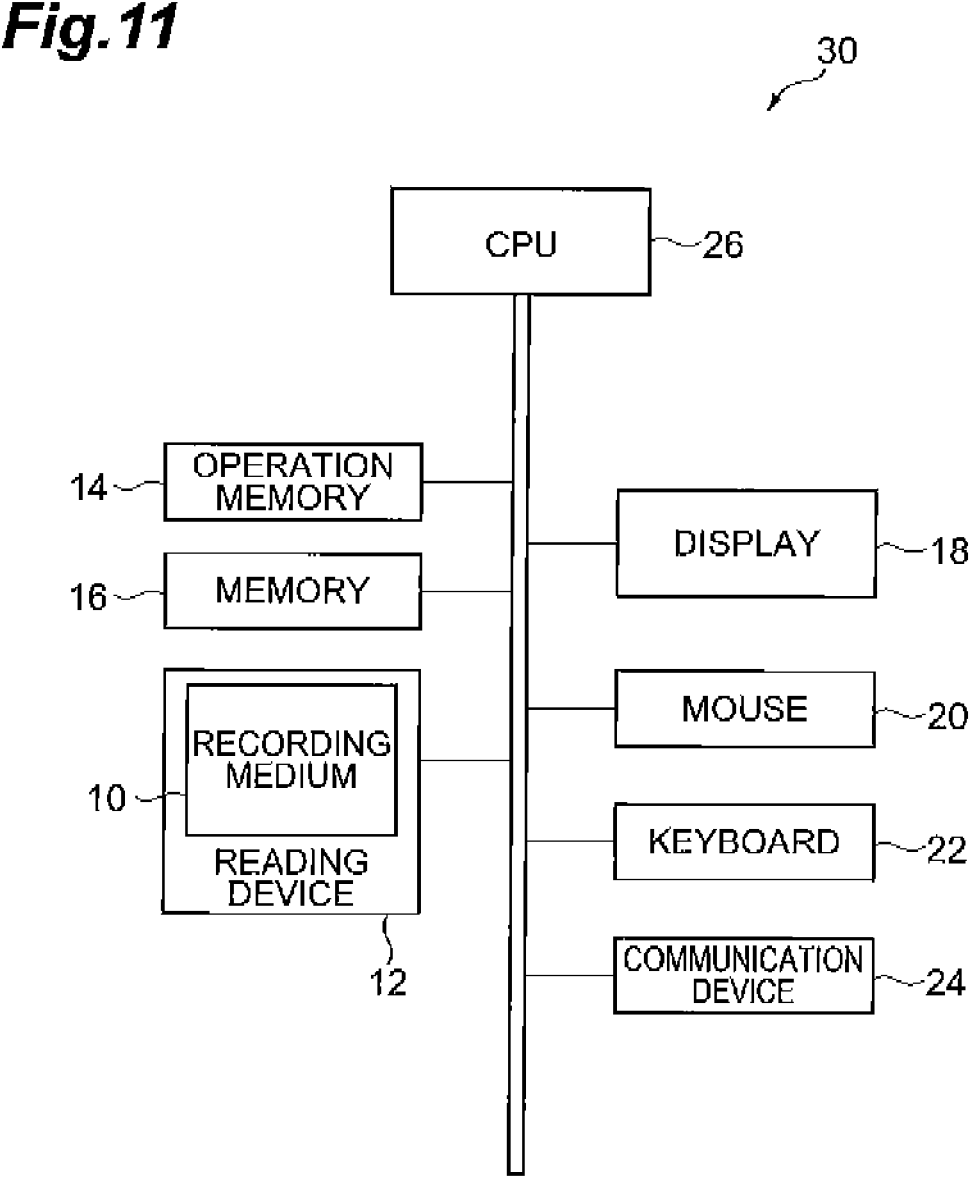
FIG. 11 A diagram showing the configuration of hardware of a computer for executing the image processing program.
Figure 12:
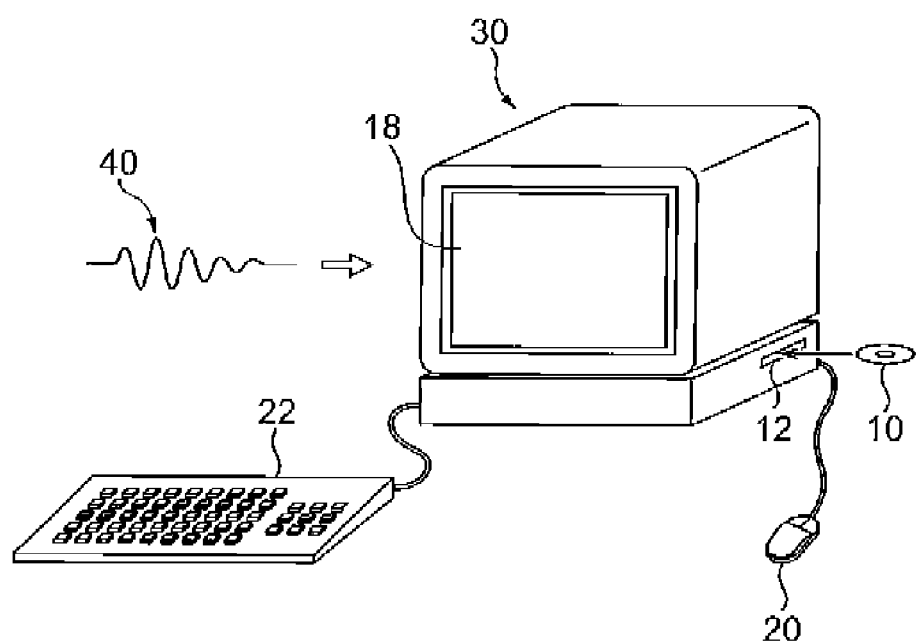
FIG. 12 A schematic diagram of the computer for executing the image processing program.

FIG. 11 is a diagram showing the configuration of hardware of the computer for executing the program recorded in the recording medium; FIG. 12 is a schematic diagram of the computer for executing the program recorded in the recording medium. Here, examples of the computer include a DUD player, a set top box, a cell phone, a PDA and a portable car navigation system, each of which incorporates a CPU and executes software processing and control.

As shown in FIGS. 11 and 12, the computer 30 includes: a reading device 12 formed with a flexible disc drive device, a CD-ROM drive device, a DVD drive device or the like; an operation memory 14 formed with a RAM or the like; a memory 16 formed with a ROM or the like; a display 18 that is a display device; a mouse 20 and a keyboard 22 that are input devices; a communication device 24 for transmitting and receiving data or the like; the CPU 26 that controls the execution of the program. In the computer 30 configured as described above, when the recording medium 10 is inserted into the reading device 12, the image processing program P10 stored in the recording medium 10 is read by the reading device 12 and is input to the computer 30, and the CPU 26 executes the image processing program P10. Consequently, the computer 30 operates as the image processing device of the present invention.

As shown in FIG. 12, the image processing program P10 may be provided through a network as computer data signals 40 superimposed on a carrier wave. In this case, the computer 30 can store in the memory 16 the image processing program P10 received by the communication device 24, and execute the image processing program P10 through the CPU 26.

DESCRIPTION OF SYMBOLS

10: Recording medium, 12: Reading device, 14: Operation memory, 16: Memory, 18: Display, 20: Mouse, 22: Keyboard, 24: Communication device, 30: Computer, 40: Computer data signal, 100: Image processing device, 101: Image input unit, 102: Processing pixel group determination unit, 103: Frequency component processing unit, 103A: Spatial frequency transformation unit, 103E: Temporal frequency transformation unit, 103C: Temporal high-frequency component processing unit, 103D: Inverse temporal frequency transformation unit, 103E: Inverse spatial frequency transformation unit, 104: Processing completion frame generation unit, 105: Processed frame storage unit, 106: Image output unit, P10: Image processing program, P11: Image input module, P12: Processing pixel group determination module, P13: Frequency component processing module, P13A: Spatial frequency transformation module, P13B: Temporal frequency transformation module, P13C: Temporal high-frequency component processing module, P13D: Inverse temporal frequency transformation module, P13E: Inverse spatial frequency transformation module, P14: Processing completion frame generation module, P15: Processed frame storage module, P16: Image output module

What is claimed is:

1. An image processing device comprising:
image input unit that inputs picture signals comprising a plurality of frame images from outside;
processed frame storage unit that stores a processed frame image on which image processing has already been completed;
a processor which functions as:
processing pixel group determination unit that determines a to-be-processed pixel group from the plurality of frame images of the picture signals input from the image input unit based on a first predetermined rule and that determines a processed pixel group from the processed frame image stored in the processed frame storage unit based on a second predetermined rule;
frequency component processing unit that extracts at least a temporal frequency component from the to-be-processed pixel group and the processed pixel group determined by the processing pixel group determination unit, that executes predetermined coefficient processing on a temporal high-frequency component of the extracted temporal frequency component and that acquires the executed to-be-processed pixel group on which the predetermined coefficient processing has been executed; and
processing completion frame generation unit that generates a processing completion frame image from the executed to-be-processed pixel group acquired by the frequency component processing unit; and
image output unit that outputs to the outside the processing completion frame image generated by the processing completion frame generation unit and that stores, as the processed frame image, the processing completion frame image in the processed frame storage unit, wherein the frequency component processing unit prevents the predetermined coefficient processing from being executed on a component having low sensitivity in visual characteristic included in the temporal high-frequency component, wherein the predetermined coefficient processing is processing in which an absolute value of the frequency component and a predetermined threshold value are compared, and when the absolute value of the frequency component is more than the threshold value, the frequency component is maintained and when the absolute value of the frequency component is not more than the threshold value, a predetermined value is substituted for the frequency component.

2. An image processing device comprising:

image input unit that inputs picture signals comprising a plurality of frame images from outside;

processed frame storage unit that stores a processed frame image on which image processing has already been completed;

a processor which functions as:
   processing pixel group determination unit that determines a to-be-processed pixel group from the plurality of frame images of the picture signals input from the image input unit based on a first predetermined rule and that determines a processed pixel group from the processed frame image stored in the processed frame storage unit based on a second predetermined rule;
   frequency component processing unit that extracts a spatial frequency component and a temporal frequency component from the to-be-processed pixel group and the processed pixel group determined by the processing pixel group determination unit, that executes predetermined coefficient processing on a spatial low-frequency component and a spatial high-frequency component included in a temporal high-frequency component of the extracted temporal frequency component and that acquires the executed to-be-processed pixel group on which the predetermined coefficient processing has been executed; and
   processing completion frame generation unit that generates a processing completion frame image from the executed to-be-processed pixel group acquired by the frequency component processing unit; and image output unit that outputs to the outside the processing completion frame image generated by the processing completion frame generation unit and that stores, as the processed frame image, the processing completion frame image in the processed frame storage unit, wherein the predetermined coefficient processing is processing in which an absolute value of the frequency component and a predetermined threshold value are compared, and when the absolute value of the frequency component is more than the threshold value, the frequency component is maintained and when the absolute value of the frequency component is not more than the threshold value, a predetermined value is substituted for the frequency component.

3. The image processing device of claim 2,
wherein the frequency component processing unit executes spatial frequency transformation on the to-be-processed pixel group and the processed pixel group to extract the spatial frequency component, and executes temporal frequency transformation on the extracted spatial frequency component to extract the temporal frequency component.

4. The image processing device of claim 1,
wherein the processing completion frame generation unit generates the processing completion frame image by combining a plurality of executed to-be-processed pixel groups such that, in plurality of executed to-be-processed pixel groups acquired by the frequency component processing unit, at least one or more pixels are superimposed on each other.

5. The image processing device of claim 2,
wherein the processing completion frame generation unit generates the processing completion frame image by combining a plurality of executed to-be-processed pixel groups such that, in plurality of executed to-be-processed pixel groups acquired by the frequency component processing unit, at least one or more pixels are superimposed on each other.

6. The image processing device of claim 3,
wherein the processing completion frame generation unit generates the processing completion frame image by combining a plurality of executed to-be-processed pixel groups such that, in plurality of executed to-be-processed pixel groups acquired by the frequency component processing unit, at least one or more pixels are superimposed on each other.

7. The image processing device of claim 1,
wherein the predetermined value substituted for the frequency component is zero.

8. An image processing method executed by an image processing device including processed frame storage unit that stores a processed frame image on which image processing has already been completed, the image processing method comprising:

an image input step of inputting picture signals comprising a plurality of frame images from outside;

a processing pixel group determination step of determining a to-be-processed pixel group from the plurality of frame images of the picture signals input from the image input unit based on a first predetermined rule and of determining a processed pixel group from the processed frame image stored in the processed frame storage unit based on a second predetermined rule;

a frequency component processing step of extracting at least a temporal frequency component from the to-be-processed pixel group and the processed pixel group determined by the processing pixel group determination step, of executing predetermined coefficient processing on a temporal high-frequency component of the extracted temporal frequency component and of acquiring the executed to-be-processed pixel group on which the predetermined coefficient processing has been executed;

a processing completion frame generation step of generating a processing completion frame image from the executed to-be-processed pixel group acquired by the frequency component processing step; and an image output step of outputting to the outside the processing completion frame image generated by the processing completion frame generation step and of storing, as the processed frame image, the processing completion frame image in the processed frame storage unit, wherein the frequency component processing step prevents the predetermined coefficient processing from being executed on a component having low sensitivity in visual characteristic included in the temporal high-frequency component, wherein the predetermined coefficient processing is processing in which an absolute value of the frequency component and a predetermined threshold value are compared, and when the absolute value of the frequency component is more than the threshold value, the frequency component is maintained and when the absolute value of the frequency component is not more than the threshold value, a predetermined value is substituted for the frequency component.

9. An image processing method executed by an image processing device including processed frame storage unit that stores a processed frame image on which image processing has already been completed, the image processing method comprising:

an image input step of inputting picture signals comprising a plurality of frame images from outside;

a processing pixel group determination step of determining a to-be-processed pixel group from the plurality of frame images of the picture signals input from the image input unit based on a first predetermined rule and of determining a processed pixel group from the processed frame image stored in the processed frame storage unit based on a second predetermined rule;

a frequency component processing step of extracting a spatial frequency component and a temporal frequency component from the to-be-processed pixel group and the processed pixel group determined by the processing pixel group determination step, of executing predetermined coefficient processing on a spatial low-frequency component and a spatial high-frequency component included in a temporal high-frequency component of the extracted temporal frequency component and of acquiring the executed to-be-processed pixel group on which the predetermined coefficient processing has been executed;

a processing completion frame generation step of generating a processing completion frame image from the executed to-be-processed pixel group acquired by the frequency component processing step; and an image output step of outputting to the outside the processing completion frame image generated by the processing completion frame generation step and of storing, as the processed frame image, the processing completion frame image in the processed frame storage unit, wherein the predetermined coefficient processing is processing in which an absolute value of the frequency component and a predetermined threshold value are compared, and when the absolute value of the frequency component is more than the threshold value, the frequency component is maintained and when the absolute value of the frequency component is not more than the threshold value, a predetermined value is substituted for the frequency component.

10. A non-transitory computer-readable storage medium for storing an image processing program instructing a computer to function as:

image input unit that inputs picture signals comprising a plurality of frame images from outside;

processed frame storage unit that stores a processed frame image on which image processing has already been completed;

processing pixel group determination unit that determines a to-be-processed pixel group from the plurality of frame images of the picture signals input from the image input unit based on a first predetermined rule and that determines a processed pixel group from the processed frame image stored in the processed frame storage unit based on a second predetermined rule;

frequency component processing unit that extracts at least a temporal frequency component from the to-be-processed pixel group and the processed pixel group determined by the processing pixel group determination unit, that executes predetermined coefficient processing on a temporal high-frequency component of the extracted temporal frequency component and that acquires the executed to-be-processed pixel group on which the predetermined coefficient processing has been executed;

processing completion frame generation unit that generates a processing completion frame image from the executed to-be-processed pixel group acquired by the frequency component processing unit; and image output unit that outputs to the outside the processing completion frame image generated by the processing completion frame generation unit and that stores, as the processed frame image, the processing completion frame image in the processed frame storage unit, wherein the frequency component processing unit prevents the predetermined coefficient processing from being executed on a component having low sensitivity in visual characteristic included in the temporal high-frequency component, wherein the predetermined coefficient processing is processing in which an absolute value of the frequency component and a predetermined threshold value are compared, and when the absolute value of the frequency component is more than the threshold value, the frequency component is maintained and when the absolute value of the frequency component is not more than the threshold value, a predetermined value is substituted for the frequency component.

11. A non-transitory computer-readable storage medium for storing an image processing program instructing a computer to function as:

image input unit that inputs picture signals comprising a plurality of frame images from outside;

processed frame storage unit that stores a processed frame image on which image processing has already been completed;

processing pixel group determination unit that determines a to-be-processed pixel group from the plurality of frame images of the picture signals input from the image input unit based on a first predetermined rule and that determines a processed pixel group from the processed frame image stored in the processed frame storage unit based on a second predetermined rule;

frequency component processing unit that extracts a spatial frequency component and a temporal frequency component from the to-be-processed pixel group and the processed pixel group determined by the processing pixel group determination unit, that executes predetermined coefficient processing on a spatial low-frequency component and a spatial high-frequency component included in a temporal high-frequency component of the extracted temporal frequency component and that acquires the executed to-be-processed pixel group on which the predetermined coefficient processing has been executed;

processing completion frame generation unit that generates a processing completion frame image from the executed to-be-processed pixel group acquired by the frequency component processing unit; and image output unit that outputs to the outside the processing completion frame image generated by the processing completion frame generation unit and that stores, as the processed frame image, the processing completion frame image in the processed frame storage unit, wherein the predetermined coefficient processing is processing in which an absolute value of the frequency component and a predetermined threshold value are compared, and when the absolute value of the frequency component is more than the threshold value, the frequency component is maintained and when the absolute value of the frequency component is not more than the threshold value, a predetermined value is substituted for the frequency component.

* * * * *